US009836754B2

(12) United States Patent
Farahat

(10) Patent No.: US 9,836,754 B2
(45) Date of Patent: Dec. 5, 2017

(54) EVALUATING COINCIDENT INTERACTION INDICATORS

(71) Applicant: Adobe Systems Incorporated, San Jose, CA (US)

(72) Inventor: Ayman Farahat, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 161 days.

(21) Appl. No.: 13/950,782

(22) Filed: Jul. 25, 2013

(65) Prior Publication Data

US 2015/0032760 A1  Jan. 29, 2015

(51) Int. Cl.
G06Q 30/02 (2012.01)

(52) U.S. Cl.
CPC .................... G06Q 30/02 (2013.01)

(58) Field of Classification Search
CPC ................ G06F 17/30864; G06F 17/30867
USPC ........................................................ 707/784
See application file for complete search history.

(56) References Cited

U.S. PATENT DOCUMENTS

2008/0114639 A1* 5/2008 Meek ..................... G06Q 30/02
                                                          705/14.41
2011/0125739 A1* 5/2011 Wexler et al. ............... 707/734
2013/0268514 A1* 10/2013 Kandogan et al. .......... 707/722
2014/0040011 A1* 2/2014 Kim ....................... G06Q 30/02
                                                          705/14.43
2014/0156202 A1* 6/2014 Floridia .............. H01J 49/0009
                                                          702/23
2014/0297372 A1* 10/2014 Ookubo et al. .............. 705/7.39

OTHER PUBLICATIONS

James H. Stock and Mark W. Watson, May 7, 2010, Woodrow Wilson School and Department of Economics, Princeton University and the National Bureau of Economic Research, pp. 2-7.*

* cited by examiner

*Primary Examiner* — Mohammad S Rostami
*Assistant Examiner* — Allen Lin
(74) *Attorney, Agent, or Firm* — Kilpatrick Townsend & Stockton LLP

(57) ABSTRACT

Disclosed are embodiments for determining the impact of one or more latent factors on user interaction metrics based at least in part on an impact model. The embodiments identify a value for a user interaction metric, the user interaction metric measuring interaction with content and identify an impact for a latent factor on the user interaction metric, the impact determined based at least in part on a model providing a relationship between the user interaction metric and the latent factor. Additionally, embodiments may involve adjusting an attribute of the electronically provided content based at least in part on the impact of the latent factor on the user interaction metric.

5 Claims, 6 Drawing Sheets

Predicting Arts Deal Using Dynamic Factors

Predicting Rest Groupons

EVALUATING COINCIDENT INTERACTION INDICATORS

FIELD

This disclosure relates generally to computer software and more particularly relates to the creation, modification, use, evaluation and distribution of electronic content.

BACKGROUND

User interaction metrics are used to measure user interaction with content. Such metrics can be determined in a number of different ways. For example, metrics may be obtained by measuring a length of time of a user's interaction with a piece of content, a frequency of interaction with a piece of content, a time gap between such interactions, a type of interaction, and/or other types of information. The content may be electronically provided and may include internet web pages, network communications, communications over social media platforms, and other types of electronically provided content. User interaction metrics are useful for evaluating effectiveness of the content. For instance, a metric may identify that electronically provided content receives a high volume of user traffic and thus may indicate that the subject matter of the content is effective.

SUMMARY OF THE INVENTION

Disclosed are embodiments identifying a value for a user interaction metric, the user interaction metric measuring interaction with content and embodiments for identifying an impact for a latent factor on the user interaction metric, the impact determined based at least in part on a model providing a relationship between the user interaction metric and the latent factor. Additionally, disclosed are embodiments for adjusting an attribute of the electronically provided content based at least in part on the impact of the latent factor on the user interaction metric.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
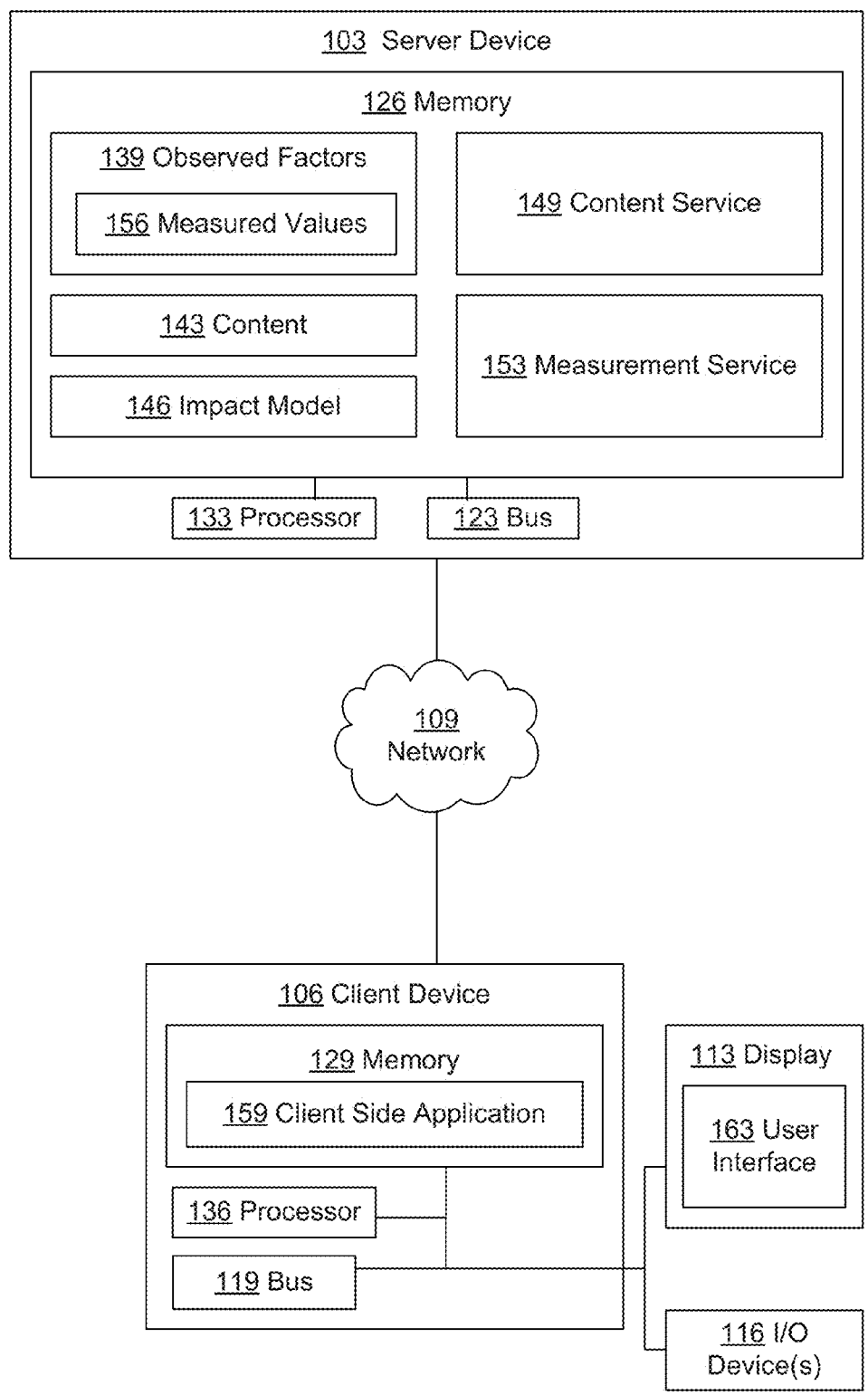
FIG. 1 is a block diagram depicting exemplary computing devices in an exemplary computing environment for implementing certain embodiments.

Embodiments derive the impact of one or more latent factors on one or more observable metrics. As used herein, the phrase "latent factor" refers to any factor that is difficult or impossible to directly observe, measure, and/or quantify. Deriving the impact of latent factors can be beneficial in various contexts. For example, the impact of latent factors can be useful in the context of assessing the effectiveness of advertising and other electronic content. Specifically, the impact of latent factors can be used to adjust or supplement collected metric information regarding electronic content. For example, user interaction metrics associated such content may be tracked to assess the effectiveness of that content. A metric indicating that users spend relatively large amounts of time interacting with content may indicate that the subject matter of the content is effective. However, in some instances, the measured values of user interaction metrics may not accurately indicate the effectiveness of the electronically provided content because latent factors may impact the significance of measured values of those user interaction metrics. Embodiments derive the impact of one or more latent factors on one or more observable metrics such as user interaction metrics associated with electronic content so that the user interaction metrics can be adjusted or otherwise more accurately interpreted. Examples of latent factors include economic factors, brand equity, brand loyalty, a goodwill associated with a brand, and/or other factors that are difficult or impossible to directly observe, measure, and/or quantify that are related to user interaction with the content.

The following example illustrates an impact of an exemplary latent factor. In this example, a sales entity adds a promotional advertisement for a particular short sleeve shirt onto a website that sells those shirts and monitors resulting sales of those short sleeve shirts made through the website. Number of sales, number of content clicks, and other measurable user interaction-based metrics are indicative of the effectiveness of the new advertisement. Content click statistics, for example, may be used as a measure of the effectiveness of the advertisement. However, in addition to depending upon the effectiveness of the advertisement, the content click statistics may also be dependent on one or more latent factors. For example, brand loyalty may drive customers to regularly visit the web page regardless of what the advertisement offers, e.g., regardless of the type and/or extent of promotional and/or advertising content.

The impact of a latent factor (such as brand loyalty) with respect to measurable user interaction metrics (such as a content click statistic) can be estimated using techniques disclosed herein. Estimates of the impact of latent factors can then be used to make more informed decisions. A correlation between a measurable user interaction metric and one or more latent factors can be identified and used to appropriately change the content to be more effective. For example, user interaction metrics can be adjusted so that they do not reflect the latent factor and thus more accurately indicate content effectiveness. As a specific example, where a statistic that indicates that content clicks increased from 5000 per day to 10000 per day after launch of an advertisement and thus indicating a user click increase of 5000, the statistic may be reduced to 4000 based on an estimation that 1000 of such clicks were due to brand loyalty. The advertisement may be changed based on this information, for example, by changing the percentage discount higher or lower. Information about the impact of one or more latent factors can also be used to predict future advertisement performance and to achieve other benefits.

Generally, a proprietor of the content may make one or more decisions related to the content based on the impact of the latent factors on the user interaction metrics. For example, the user interaction metrics may be adjusted to more accurately reflect content effectiveness. As a specific example, a version of content organized in a first way, e.g., with a large title and bullet point elements, may be identified as more effective than a version of that content organized in a second way, e.g., with a small title, followed by an image, followed by paragraph text. The difference in effectiveness may be demonstrated by one or more metrics that have been adjusted to account for one or more latent factors. For instance, the content organized in the first way may generate more user traffic than the second way. However, the user traffic may be more significantly impacted by the latent factors during periods of time when the content is organized the first way than the second way. Accordingly, the user interaction metrics may be adjusted by the estimated impact of the latent factors on the metrics over the respective periods of time. The adjusted metrics may be used to determine a more accurate representation of the effectiveness of the content on the metrics.

In one example, the content may be electronically provided content over a network to users on one or more client devices. For instance, the content may be advertising and/or promotional material such as coupons or marketing information included in a web page or a user interface. The web page or user interface may be provided to client devices for interaction by the users. A measurement service may measure one or more user interaction metrics associated with the electronically provided content as the user accesses the content. For instance, the measurement service may measure user interaction metrics such as a number of web page views, a number of mouse clicks, a number of mouse gestures, an amount of time spent on the web page, an amount of time elapsed before a mouse gesture, a frequency of accesses to the web page, and/or other types of user interaction metrics. The measurement service then derives the impact value of the latent factors on the measurable user interaction metrics.

In one embodiment, the measurement service receives an impact model that estimates the impact of one or more latent factors on the measureable user interactions metrics over a period of time. The measurement service may use a dynamic impact model. As used herein, the phrase "dynamic impact model" refers to a model that represents or defines the impact of one or more latent factors on one or more metrics over time. One example of a dynamic impact model is the Stock and Watson economic impact model that estimates coincident and leading economic indicators which represent the impact of latent factors on measurable economic indicators over a period of time.

The Stock and Watson economic impact model is a macroeconomic model that determines an overall indicator for the economy as a function of measurable economic indicators and unobservable factors. To this end, the Stock and Watson model involves determining an overall health of the economy using economic indicators such as employment rates, unemployment rates, inflation, investment trends, and other measurable economic indicators and then determining what impact, if any, the unobservable factors have on the health of economy. For instance, these unobservable factors may directly impact how quickly a measurable economic indicator affects the overall health of the economy. Thus, the Stock and Watson economic impact model reduces all of the measureable economic indicators and the unobservable factors to a core economic index that more accurately describes the overall economy.

Based on the impact model, a measurement service derives or otherwise identifies impact values of the latent factors on user interaction metrics. An impact value quantifies a relationship between one or more user interaction metrics and one or more latent factors. For example, the measurement service may estimate the impact values in a similar manner as the Stock and Watson economic impact model. In one embodiment, an impact value quantifies a change in a user interaction metric based on a change in the latent factors. For instance, a change in a value corresponding to the brand loyalty may impact the value of the measured user interaction metric. This impact to the value of the measured user interaction metric caused by the change in the latent factor may be estimated to be the impact value as derived and/or otherwise identified from the impact model. A proprietor of content may offer certain incentives in the form of promotional and/or advertising content to increase the amount of user traffic to their webpage, as discussed above. Users may receive an email notification of the incentives and navigate to the webpage because of the notification. The proprietor may measure the effectiveness of the incentives based on the amount of user traffic to the web page. A portion of the user traffic may be based on the latent factors. For example, customers loyal to the proprietor may visit the web page regardless of the content of the promotion, time of the year, economic situations, and/or other circumstances. Thus, the brand loyalty latent factor impacts the measured user interaction metrics. The measurement service determines the magnitude of the impact on the measured user interaction metrics based on the impact model.

The impact values may then be used to adjust the measured user interaction metrics or otherwise used by a creator, proprietor, or distributor of the content to make one or more decisions related to the electronically provided content. For example, a proprietor may adjust the frequency of providing the electronic content to recipient users, the quantity of electronic content provided, and/or other factors associated with the content based on the adjusted user interaction metrics. As a specific example, the estimated impact value may indicate that the brand loyalty latent factor has a 1:1 ratio with the measured user interaction metric. Thus, a one unit change in the measurable user interaction metric may occur for every one unit change in the latent brand loyalty factor. The impact value may be defined over a period of time where the ratio between the latent factor and the measurable user interaction metric may change over time. The proprietor of the content may determine the effectiveness of the content based on the user interaction metrics and by taking into the account the estimated impact value of the latent factors on the user interaction metrics over time.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 depicts an exemplary computing environment for evaluating the impact of latent factors on observed user interaction with electronic provided content based on an impact model. The methods and systems disclosed herein are also applicable on other computing systems and environments. The environment shown in FIG. 1 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and 123 will typically be included in a device as well.

As used herein, the term "application" or "service" refers to any program instructions or other functional components that execute on a device. An application or service may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to processors 133 and 136, respectively, that execute computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to provide electronic content to one or more client devices 106. For example, the server device 103 may include content 143 in a user interface 163 provided to the client device 106 that is rendered on the display 113 associated with the client device 106.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, the server device 103 includes a memory 126 that includes observed factors 139, content 143, an impact model 146, a content service 149 and a measurement service 153. In one embodiment, the content service 149 provides electronic content 143 to users on client devices 106. For instance, the content service 149 may generate web pages and/or user interfaces 163 that include the content 143. The content 143 may be advertisements, information related to items available for purchase, news, email, message boards, financial information, and/or any other type of electronic content. In some embodiments, the content service 149 may be an electronic commerce service that provides information related to items available for purchase and performs one or more backend functions related to the online presence of a merchant.

The measurement service 153 measures one or more metrics related to user interaction with the electronic content 143 provided by the content service 149. For example, the user interaction may be related to user traffic of the web pages provided by the content service 149. In some instances, the measurement service 153 measures user interaction by observing a number of page views, a number of mouse clicks, a number of mouse gestures, a number of purchases, a time of the user interaction, an amount of time spent, and/or other factors related to the traffic of the content 143 provided by the content service 149. In some embodiments, the measurement service 153 may utilize an executable embedded in the web pages and/or user interfaces 163 provided by the content service 149 that observes the user interaction metrics.

The observed factors 139 may be a listing of one or more user interaction metrics that are observed and/or measured by the measurement service 153. For instance, the observed factors 139 correspond to the measurements taken by the measurement service 153 such as the number of page views, the number of mouse clicks, the number of mouse gestures, the number of purchases, the time of the user interaction, the amount of time spent, and/or other factors measured and/or observed by the measurement service 153. Additionally, each observed factor 139 may have a measured value 156 as measured and/or observed by the measurement service 153. In some instances, the measured values 156 for each of the observed factors 139 may relate to each specific item of content 143 provided to the client devices 106. In some other instances, the measured values 156 may relate to multiple items of the available content 143.

The impact model 146 represents a dynamic impact model that defines the impact of latent factors on observed factors 139. For instance, the latent factors may include brand equity, goodwill, and/or other factors that effect a user's decision to interact with the content 143 provided by the content service 149. These latent factors may not be observable by the measurement service 153 and/or any other service implemented by the server device 103. However, the observed factors 139 may be coincident with the latent factors. For instance, observed economic data has been determined to be coincident with one or more unobserved dynamic factors according to the Stock and Watson model. (M.W.W James H. Stock. *New Indexes of Coincident and Leading Economic Indicators*. MIT Press., 1989), which is incorporated herein by reference in its entirety. According to the Stock and Watson model, the relationship defining the coincidence between unobserved dynamic factors and observed economic data may be defined by a dynamic impact model. In particular, the Stock and Watson model developed economic indicators based on econometric theories as applied to the observed economic data.

The impact model 146 can use the Stock and Watson economic model or any other suitable model to correlate factors in the user interaction context. For instance, the impact model 146 defines a relationship between one or more of the measured values 156 of the one or more observed factors 139 and one or more latent variables, as will be described. According to the impact model 146, the measured values 156 of the observed factors 139 may have a component dependent on the latent factors, a component that corresponds to exogenous variables, and/or a component that relates to an error term. The impact model 146 may be a dynamic impact model that describes the impact of the latent factors on the measured values 156 of the observed factors 139.

The client device 106 includes a memory 129 that includes a client side application 146. The client side application 159 may be a browser and/or other application that renders web pages and/or user interfaces 163 on the display 113 associated with the client device 106. In some instances, the client side application 159 may communicate with the measurement service 153 to relay information related to the measured values 156 for one or more of the observed factors 139. For example, the user interface 163 may include an embedded executable that obtains the measured values 156 and requests that client side application 159 to transmit the measured values 156 to the measurement service 153.

Figure 2:
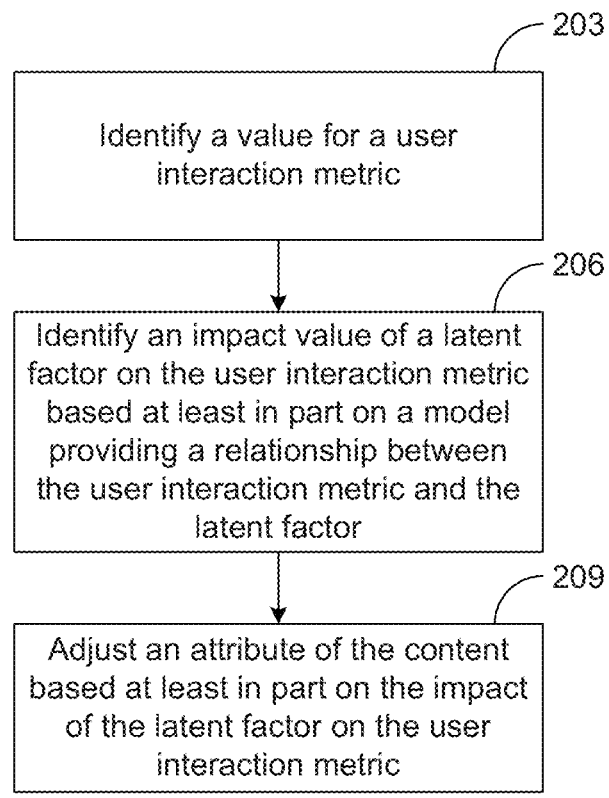
FIG. 2 is a flow chart illustrating an exemplary method for deriving a impact value of latent factors on one or more user interaction metrics.

FIG. 2 is a flowchart that provides one example of the operation of a portion of the server device 103 according to certain embodiments. It is understood that the flowchart of FIG. 2 provides merely an example of the many different types of functional arrangements that may be employed to implement the operation of the portion of the server device 103. As an alternative, the flowchart of FIG. 2 may be viewed as depicting an example of steps of a method implemented in the server device 103 according to one or more embodiments.

Beginning at step 203, the measurement service 153 identifies a value for a user interaction metric where the user interaction metric measures interaction with content. For instance, the measurement service 153 measures the observed factors 139 to obtain the measured values 156 for each of the observed factors 139. To this end, an executable may be embedded in the user interface 163 rendered on the display 113 of the client device 103 that gathers information related to the observed factors 139 based on a user's interaction with the user interface 163. For instance, the user interaction metrics may include a number of page views, a number of mouse clicks, a number of mouse gestures, a number of purchases, a time of the user interaction, an amount of time spent, and/or other factors related to the traffic of the content 143 provided by the content service 149. The executable may gather information related to the user interaction that is then provided to the measurement service 153 to generate the measured values 156 based on the gathered information.

As an example, the content 143 provided by the content service 149 may be coupons and/or other advertising content. For example, the content service 149 may include incentives in the coupons for purchasing items associated with various categories. The content service 149 may then provide the coupons to users via an email communication, a communication over a social media platform, a web page, a user interface, and/or other personalized form of communication provided to the client device 106. For instance, the items may be associated with categories such as arts, beauty, shopping, restaurants, and/or any other category. The measurement service 153 may measure, receive, and/or identify the measured values 156 of observed factors 139 when a user interacts with the provided content 143. For example, the observed factors 139 may include a number of user purchases of the coupon included in the communication provided to the client device 106, a number of views of the coupon included in the communication, a number of purchases, a number of mouse gestures, and/or any other user interaction associated with the coupon.

Next, at step 206, the measurement service 153 identifies an impact value on the user interaction metric based at least in part on a model providing a relationship between the user interaction metric and the latent factor. In one embodiment, the model defines an impact of one or more latent factors on one or more user interaction metrics. For example, the measurement service 153 may receive the impact model 146 that defines the impact of the latent factors on the measured values 156 of the observed factors 139. In one embodiment, the impact model 146 may be a dynamic impact model, such as one based on the Stock and Watson model, and may be described as follows:

$$y_t = Pf_t + Qx_t + u_t \tag{1}$$

$$f_t = Rw_t + A_1 f_{t-1} + A_2 f_{t-2} + \ldots + v_t \tag{2}$$

$$u_t = C_1 u_{t-1} + C_2 u_{t-2} + \ldots + \epsilon_t \tag{3}$$

where y is a vector of independent variables (i.e. user interaction metrics), f is a vector of unobserved and/or latent variables, x is a vector of exogenous variables, and u is a vector of unique and/or idiosyncratic disturbances (i.e., error terms). P and Q are matrices of parameters where P is the matrix that describes the overall impact on f and Q is the matrix that describes the overall impact on x. In addition, w is a vector of exogenous variables, R is a matrix of parameters that describes the overall impact of w, A is a matrix of Auto correlation parameters that describe the impact of the latent factor over time, v is a vector of disturbances (i.e., error terms), and C is a matrix of Auto correlation parameters that describes a shock to the observable (i.e. independent variables), and c is a vector of disturbances.

The impact model 146 relates each of the measured values 156 of the observed factors 139 to each one of the latent factors by a parameter. In some embodiments, this parameter may be estimated by the Stock and Watson model, as discussed above. To this end, the first equation (1) of the impact model 146 relates observed dependent variables y (i.e, the measured values 156 of the observed factors 139) to the unobserved states f (i.e., the latent factors). The exogenous vector $x_t$ corresponds to the known values in the impact model 146, i.e., the measured values 156 of the observed factors 133. For instance, referring to the coupon example, the measured values 156 may correspond to $x_t$.

The second equation (2) of the impact model 146 represents a state equation that formulates the dynamics of the latent factors as an auto-regressive process with a disturbance (i.e., error term) that may be serially correlated. An auto-regressive process corresponds to a time varying random process, as known in the art. The exogenous vector $w_t$ corresponds to known values, such as one or more measured values 156. The second equation (2) also includes past values of $f_{t-n}$ (i.e., the latent factors) where each one of the past values of the latent factors is associated with a correlation parameter.

Additionally, the third equation (3) of the impact model 146 models the serial correlation of the measurement disturbance using the auto-regression process. For instance, a serially correlated disturbance accounts for previous disturbance values and an error term associated with the disturbance, as shown in equation (3). The disturbance term accounts for previous values of the disturbance terms and a correlation parameter associated with each one of the previous disturbance terms.

The measurement service 153 identifies the impact value based at least in part on the impact model 146. The impact value represents the impact of the latent factors on the measured values 156 of the observed factors 139 according to the impact model 146. For instance, the latent factors include factors such as brand loyalty, brand equity, and other factors that have an impact on the measurable factors, such as the user interaction metrics. In one embodiment, the measurement service 153 derives, estimates and/or otherwise identifies the impact values by applying the impact model 146 to the measured values 156 of the observed factors 139. For instance, the measured values 156 may be a set of user interaction data measured and/or observed over a period of time. Referring to the above coupon example, the measured values 156 may include a number of coupons purchased by users on client devices 106 over a period of time and/or any other measured values 156 of the observed factors 139. Additionally, the measured values 156 may record the number of coupons purchased by category according to the item that is the subject matter of the coupon. The proprietor and/or owner of the coupons may determine the effectiveness of the coupons based on the measured values 156 of the observed factors 139.

In one example, to simplify the derivation of the impact values that define the impact of the latent factors on the number of coupons purchased, only one latent factor may be assumed and the error terms may be assumed to not be serially correlated. Under these assumptions, the modified equation (2) becomes:

$$f_t = a_1 f_{t-1} + v_t \qquad (4)$$

As shown in equation (4), the dynamics of the latent factors does not take into account any serial correlation of the error terms. Applying the Stock and Watson model discussed above, the "a" value can be estimated to be 0.643 with a standard variance of 0.19. Based on these assumptions and the modified equation, the impact values of the latent factors on the measured values 156 of the observed factors 139 may be derived.

As an example, Table 1 depicts a sample set of impact values for a number of purchased coupons in each of the listed categories:

TABLE 1

| Category | Impact Value | Standard Deviation |
|---|---|---|
| Arts | 0.836 | 0.11 |
| Beauty | 0.6546 | 0.13 |
| Shops | 0.65003 | 0.1347 |
| Restaurants | 0.5225 | 0.144 |

As show above, the latent factor impacts the number of coupons for each category in a different manner. For every one unit change in the latent factor, the measured value 156 of the observed factor 139 is impacted as depicted in the column entitled "Impact Value." For instance, a one unit change in the latent factor impacts the number of purchased coupons related to the arts category by 0.836 units, the number of purchased coupons related to the beauty category by 0.6546 units, the number of purchased coupons related to the shops category by 0.65003 units, and the number of purchased coupons related to the restaurants category by 0.5225 units. Additionally, the standard deviation for each category represents a confidence level of the derived impact value. For instance, the impact value for coupons purchased in the arts category may be +/−0.11 the value listed in the "Impact Value," as so on. As discussed above, the latent factor may be related to brand equity, brand loyalty, a brand's good will, and/or other unobservable factors. Thus, according to this example, a one unit change in the brand loyalty latent factor results in a 0.836 unit change in the observed factor 139 (for example, the number of coupons purchased) in the arts category. The brand loyalty latent factor and/or other latent factors may be dimensionless and may not be expressed using any particular unit of measure. The results shown in Table 1 indicate that the latent factor has an impact on the measured value 156 of the observable user interaction metric and therefore can be a reliable predictor of the measured value 156 of the user interaction metric. In some embodiments, the magnitude of the impact of the latent factors on the measured values 156 may also be estimated and/or otherwise identified. For example, the variance of the idiosyncratic variable u may be estimated based on the impact model 146 and the real data.

Then, in step 209, the measurement service 153 adjusts an attribute of the content based at least in part on the impact value of the latent factor on the user interaction metric. In one embodiment, one or more marketing and/or advertising decisions may be made based on the impact values. For instance, a merchant may decide to offer more coupons and/or fewer coupons for purchase based on the impact of the latent factor on the observed factors 139. As shown in Table 1, the latent factor has a larger impact on coupons purchased in the arts category than in the restaurants category. Thus, a merchant may decide to keep the number of coupons in the arts category the same because the number of purchased coupons is highly impacted by the latent factor. Similarly, the merchant may decide to adjust the number of coupons in the restaurants category based on observed factors 139 and disregard the impact of the latent factor on the number of purchased coupons due it its low impact on the restaurants category.

Figure 3:
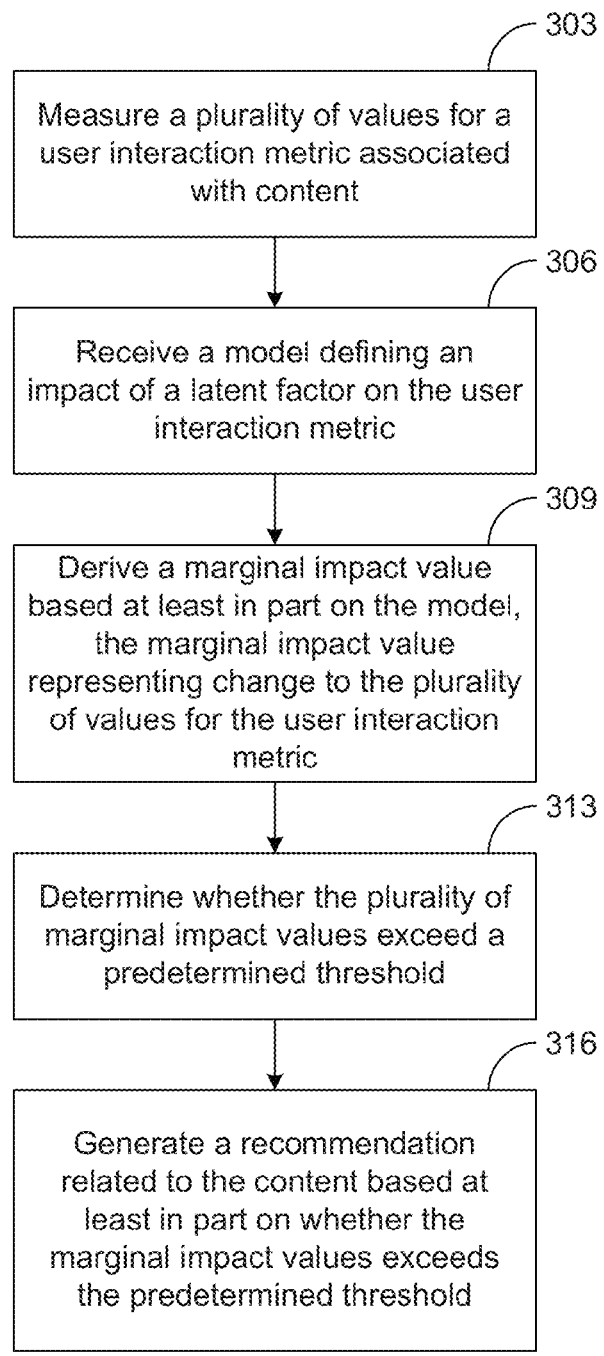
FIG. 3 is a flow chart illustrating an exemplary method for generating a recommendation related to electronically provided content based at least in part on a derived impact value.

FIG. 3 is a flowchart that provides one example of the operation of a portion of the server device 103 according to certain embodiments. It is understood that the flowchart of FIG. 3 provides merely an example of the many different types of functional arrangements that may be employed to implement the operation of the portion of the server device 103. As an alternative, the flowchart of FIG. 3 may be viewed as depicting an example of steps of a method implemented in the server device 103 according to one or more embodiments.

Beginning at step 303, the measurement service 153 measures a plurality of values for a user interaction metric associated with electronically provided content. For instance, the measurement service 153 measures a metric for one of the observed factors 139 to obtain the measured values 156 for the observed factor 139. To this end, an executable may be embedded in the user interface 163 rendered on the display 113 of the client device 103 that gathers information related to the observed factor 139 based on a user's interaction with the user interface 163. For instance, the user interaction metric may include a number of page views, a number of mouse clicks, a number of mouse gestures, a number of purchases, a time of the user interaction, an amount of time spent, and/or other factors related to the traffic of the content 143 provided by the content service 149. The executable gathers the information related to the user interaction that is then provided to the measurement service 153 to generate the measured values 156 based on the gathered information.

Next, in step 306, the measurement service 153 receives an impact model 146 that defines an impact of a latent factor on the user interaction metric. The impact model 146 relates each of the measured values 156 of the observed factor 139 to the latent factor by a parameter. In some embodiments, this parameter may be estimated by the Stock and Watson model, as discussed above. The three equations of the impact model 146 discussed above may have the structure of a Kalman filter, i.e. a linear quadratic equation based on a series of measurements measured over a period of time. In one embodiment, the Kalman filter formalism may be viewed as a Hidden Markov Model with an infinite number of states where the system is modeled with the assumption that there are unobserved and/or latent states. Implementing a model with an infinite number of states removes an extra degree of freedom in estimating the parameter thereby reducing the number of variable elements.

In step 309, the measurement service 153 derives an impact value based at least in part on the impact model 146. The impact value represents an impact on the plurality of values for the user interaction matric by the latent factor. In one embodiment, the measurement service 153 derives, estimates, and/or otherwise identifies the impact values by applying the impact model 146 to the measured values 156 of the observed factor 139. For instance, the measured values 156 may be a set of user interaction data measured and/or observed over a period of time. The measurement service 153 applies the impact model 146 to the measured values 156 to estimate the impact value of the latent factor on the observed factor 139 (i.e. the user interaction metric), as discussed above.

Then in step 313, the measurement service 153 determines whether the impact value exceeds a predetermined threshold impact value. In one embodiment, the threshold impact value represents a minimum impact value for adjusting one or more attributes of the electronically provided content. For instance, the threshold value may be a value that represents an extent of the impact of the latent factor on the user interaction metric such that one or more attributes of the electronically provided content 143 may be adjusted. Referring to the coupon example discussed above, adjusting the attributes of the content 143 may involve adjusting a number of coupons sent to users, a frequency of the coupons, a number of users receiving the coupons, and/or other quantity associated with the coupon. Additionally, adjusting the attributes of the content 143 may involve adjusting a value of the coupon, the terms of the coupon, the demographic of users receiving the coupons, and/or other attributes associated with the coupon. In one embodiment, the threshold value may be received from an owner and/or proprietor of the electronically provided content. In some instances, the threshold value may be determined from historical data.

Next, in step 316, the measurement service 153 generates a recommendation related to the electronically provided content 143 based at least in part on whether the impact value exceeds the predetermined threshold. In one embodiment, the recommendation may be a notification to the owner of the electronically provided content 143 to adjust the one or more attributes of the electronically provided content 143. In another embodiment, the recommendation may include an amount or type of attribute to adjust the electronically provided content 143.

Figure 4A:
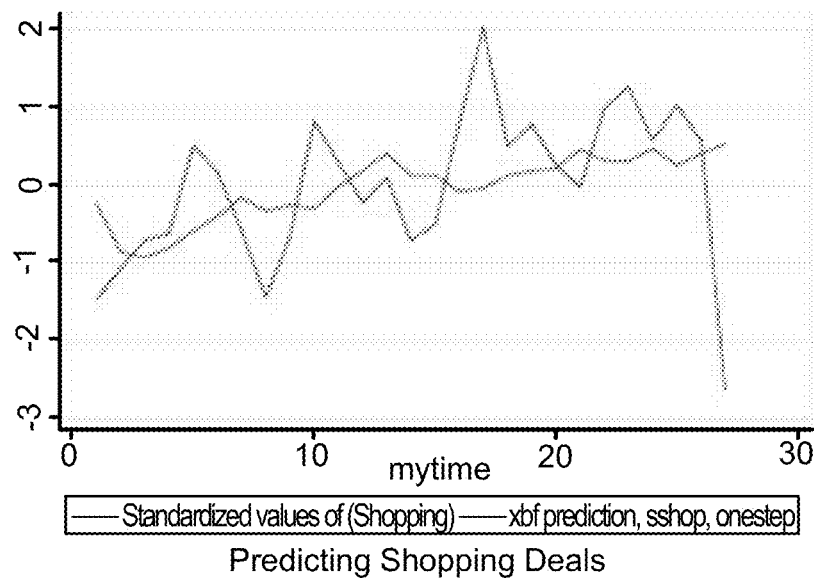
FIGS. 4A, 4B, 4C and 4D depict examples of a plurality of graphs comparing actual user interaction metrics with predicted user interaction metrics based on a latent factor for a variety of categories of data.
Figure 4B:
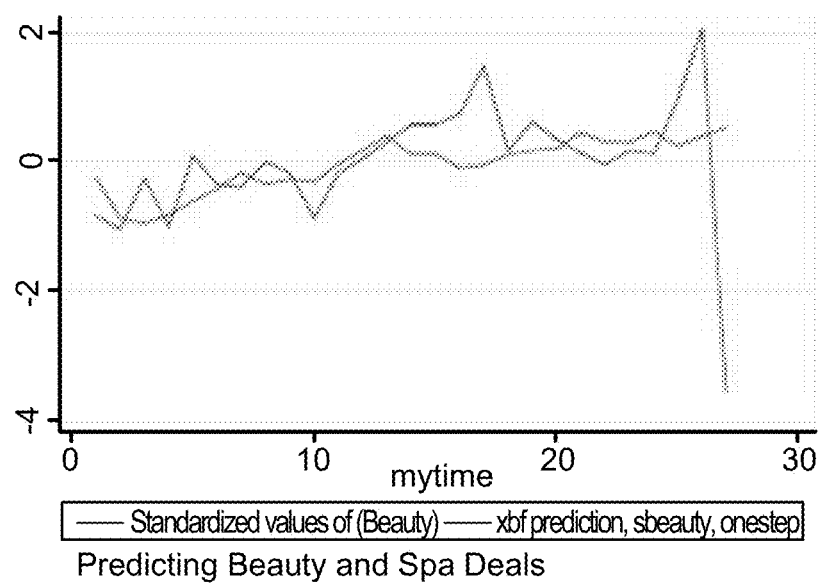
Figure 4C:
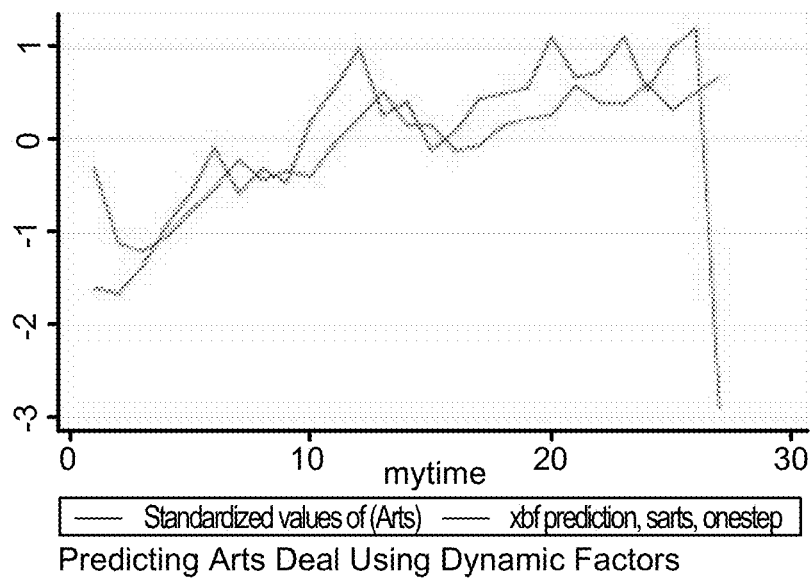
Figure 4D:
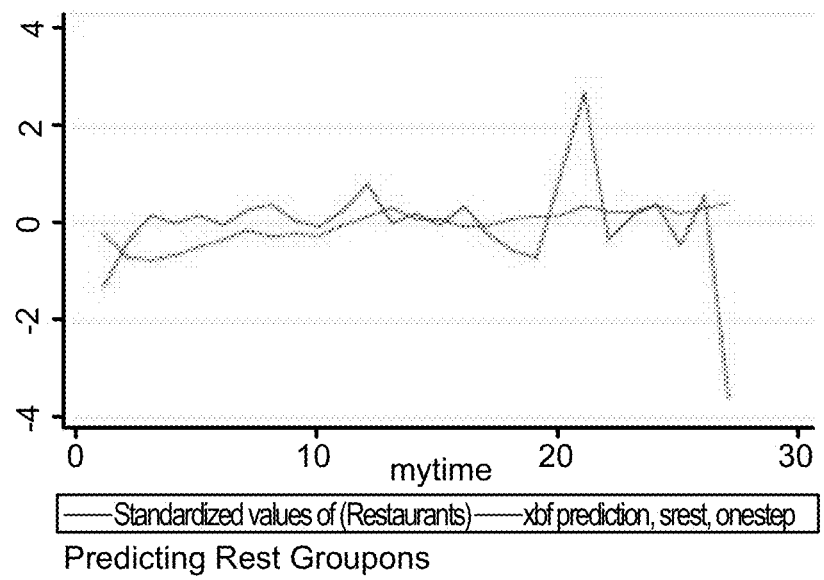

FIGS. 4A, 4b, 4c and 4D depict actual coupon purchase data and predicted coupon purchase data. The actual coupon purchase data is gathered over a period of time, as can be appreciated. For instance, the measurement service 153 measures the number of purchases based on one or more user interaction metrics. The predicted coupon purchase data is determined from the derived impact value that estimates the impact of the latent factor on the actual data according to the impact model 146. For example, the impact of the latent factor on the user interaction metrics may be identified over the same period of time as the actual data and the predicted coupon purchase data can be estimated from the impact value. FIG. 4A represents the actual coupon purchase data of the shopping category and the predicted coupon purchase data of the shopping category based on the impact value. FIG. 4B represents the actual coupon purchase data of the beauty category and the predicted coupon purchase data of the beauty category based on the impact value. FIG. 4C represents the actual coupon purchase data of the arts category and the predicted coupon purchase data of the arts category based on the impact value. FIG. 4D represents the actual coupon purchase data of the restaurant category and the predicted coupon purchase data of the restaurant category based on the impact value. As shown in FIGS. 4A, 4B, 4C and 4D, the predicted purchase data generally tracks based on the impact model 146 generally tracks the actual purchase data.

Figure 5:
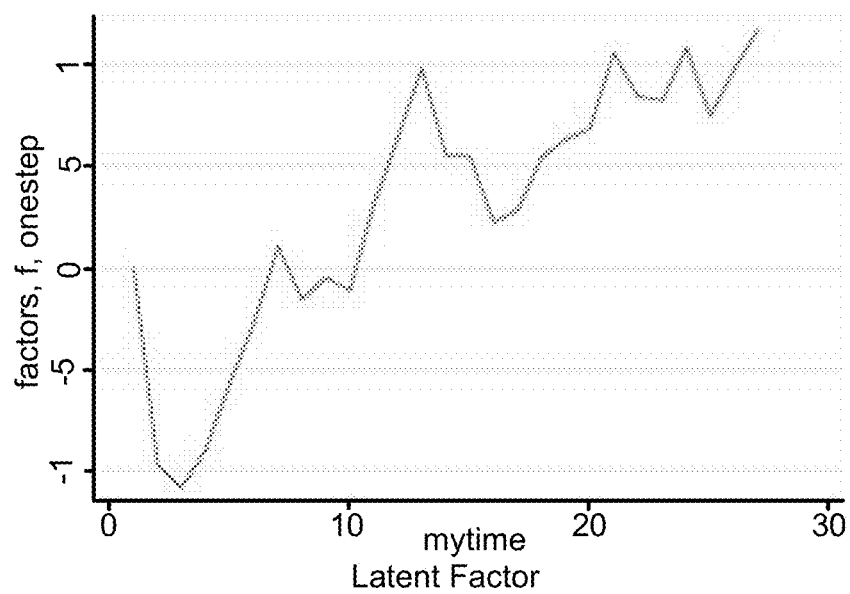
FIG. 5 depicts an example of the impact of a latent factor on the user interaction metric.

Additionally, FIG. 5 represents the impact model 146 depicted over a period of time. In this example, the impact model 146 is depicted over the same period of time as the data depicted in FIGS. 4A, 4B, 4C and 4D. As shown in FIG. 5, the impact of the latent factors generally increases across the period of time. For instance, the impact of the latent factor on the measured values 156 of the observed factors 139 increases over the period of time.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. In an environment in which electronic advertisements are provided to consumers via an electronic network, a method for modifying an electronic advertisement based on a latent-factor-adjusted measure of advertisement effectiveness, the method comprising performing, by a processing device, operations comprising:
   providing an electronic advertisement to users via the electronic network;
   tracking user interactions with the electronic advertisement to identify a measurement value for a user interaction metric to use as a measure of advertisement effectiveness, the user interaction metric measuring user interaction with the electronic advertisement on computing devices of the users, wherein the user interaction metric comprises a number of clicks, number of mouse overs, number of page views, number of mouse gestures, amount of time elapsed before a mouse gesture, amount of time spent on a web page including the electronic advertisement, or frequency of accesses to the electronic advertisement;
   estimating, by an applied impact model, an impact value, wherein:
   the impact value correlates a latent factor to the measurement value, wherein the latent factor is an aspect of the users or economy that is not directly observable, wherein the latent factor is one of an economic factor, brand equity factor, brand loyalty factor, or a brand goodwill factor,
   the impact value is determined based at least in part on the applied impact model providing a relationship between the user interaction metric and the latent factor,
   wherein the relationship identifies how the user interaction metric changes based on change in the latent factor, wherein the relationship changes over time, and wherein the impact value quantifies a change in the measurement value resulting from the change in the latent factor;
   determining a reduced measurement value, wherein the reduced measurement value is the measurement value subtracted by the change quantified by the impact value, wherein an improved measure of advertisement effectiveness is based on the reduced measurement value;
   modifying the electronic advertisement based at least in part on the reduced measurement value; and
   providing the modified electronic advertisement to additional users via the electronic network.

2. The method of claim 1, wherein the applied impact model is a dynamic impact model.

3. The method of claim 1, wherein the latent factor impacts the significance of the measurement value as a measure of advertisement effectiveness.

4. The method of claim 1, wherein the reduced measurement value is determined based on the estimated impact value correlating brand loyalty to the measurement value.

5. A system comprising:
   a processor for executing instructions stored in computer-readable medium on one or more devices,
   the instructions comprising one or more modules configured to perform the steps comprising:
   providing an electronic advertisement to users via the electronic network;
   tracking user interactions with the electronic advertisement to identify a measurement value for a user interaction metric to use as a measure of advertisement effectiveness, the user interaction metric measuring user interaction with the electronic advertisement on computing devices of the users, wherein the user interaction metric comprises a number of clicks, number of mouse overs, number of page views, number of mouse gestures, amount of time elapsed before a mouse gesture, amount of time spent on a web page including the electronic advertisement, or frequency of accesses to the web page;
   estimating, by an applied impact model, an impact value, wherein:
   the impact value correlates a latent factor to the measurement value, wherein the latent factor is an aspect of the users or economy that is not directly observable, wherein the latent factor is one of an economic factor, brand equity factor, brand loyalty factor, or a brand goodwill factor,
   the impact value is determined based at least in part on the applied impact model providing a relationship between the user interaction metric and the latent factor, wherein the relationship identifies how the user interaction metric changes based on change in the latent factor, wherein the relationship changes over time, and wherein the impact value quantifies a change in the measurement value resulting from the change in the latent factor;

determining a reduced measurement value, wherein the reduced measurement value is the measurement value subtracted by the change quantified by the impact value, wherein an improved measure of advertisement effectiveness is based on the reduced measurement value;

modifying the electronic advertisement based at least in part on the reduced measurement value; and providing the modified electronic advertisement to additional users via the electronic network.

* * * * *